(12) United States Patent
Aylward et al.

(10) Patent No.: US 6,832,037 B2
(45) Date of Patent: Dec. 14, 2004

(54) WAVEGUIDE AND METHOD OF MAKING SAME

(75) Inventors: Peter T. Aylward, Hilton, NY (US); Debasis Majumdar, Rochester, NY (US); Anne M. Miller, Batavia, NY (US); Narasimharao Dontula, Rochester, NY (US); Robert O. James, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 90 days.

(21) Appl. No.: 10/216,121

(22) Filed: Aug. 9, 2002

(65) Prior Publication Data

US 2004/0028369 A1 Feb. 12, 2004

(51) Int. Cl.[7] .................................................. G02B 6/00
(52) U.S. Cl. ...................................... 385/145; 385/124
(58) Field of Search ............................... 385/145, 126, 385/127, 128

(56) References Cited

U.S. PATENT DOCUMENTS

| | | | |
|---|---|---|---|
| 4,739,007 A | 4/1988 | Okada et al. | |
| 4,810,734 A | 3/1989 | Kawasumi et al. | |
| 5,155,788 A * | 10/1992 | Chapin et al. | 385/104 |
| 5,181,268 A * | 1/1993 | Chien | 385/128 |
| 5,408,564 A * | 4/1995 | Mills | 385/128 |
| 5,579,429 A | 11/1996 | Naum | |
| 5,625,736 A | 4/1997 | Veligdan | |
| 5,716,679 A | 2/1998 | Krug et al. | |
| 5,869,227 A | 2/1999 | Majumdar et al. | |
| 5,891,611 A | 4/1999 | Majumdar et al. | |
| 5,981,126 A | 11/1999 | Majumdar et al. | |
| 6,002,826 A | 12/1999 | Veligdan | |
| 6,086,999 A * | 7/2000 | Ilvashenko | 428/375 |
| 6,200,503 B1 * | 3/2001 | Katoot et al. | 264/1.27 |
| 6,239,907 B1 | 5/2001 | Allen et al. | |
| 6,301,417 B1 | 10/2001 | Biscardi et al. | |
| 6,307,995 B1 | 10/2001 | Veligdan | |
| 6,327,416 B1 | 12/2001 | Veligdan | |
| 6,366,727 B1 | 4/2002 | Nojiri et al. | |
| 6,428,893 B1 * | 8/2002 | Barraud et al. | 428/392 |
| 2001/0003363 A1 | 6/2001 | Marien et al. | |

FOREIGN PATENT DOCUMENTS

| WO | 1 205 777 | 5/2002 |
|---|---|---|
| WO | 03/058776 | 7/2003 |

* cited by examiner

*Primary Examiner*—Diane I. Lee
(74) *Attorney, Agent, or Firm*—Arthur E. Kluegel

(57) ABSTRACT

The invention relates to a waveguide comprising a transparent polymeric central core clad externally with one or more polymeric layers, at least one of the core or clad layer containing layered particles disposed in a polymeric binder, wherein a majority of the particles have a lateral dimension less than 1 micrometer.

51 Claims, 6 Drawing Sheets

WAVEGUIDE AND METHOD OF MAKING SAME

FIELD OF THE INVENTION

This invention relates to a waveguide containing layered particles having lateral and width dimensions each of less than 1 micrometer and to a method of making the same, and a display screen employing same.

BACKGROUND OF THE INVENTION

Optical screens typically use cathode ray tubes (CRTs) for projecting images onto the screen. The standard screen has a width to height ratio of 4:3 with 525 vertical lines of resolution. An electron beam is scanned both horizontally and vertically across the screen to form a number of pixels which collectively form the image.

Conventional cathode ray tubes have a practical limit in size, and are relatively deep to accommodate the required electron gun. Larger screens are available which typically include various forms of image projection. However, such screens have various viewing shortcomings including limited viewing angle, resolution, brightness, and contrast, and such screens are typically relatively cumbersome in weight and shape. Furthermore, it is desirable for screens of any size to appear black in order to improve viewing contrast. However, it is impossible for direct view CRTs to actually be black because they utilize phosphors to form images, and those phosphors are non-black.

Optical panels used for viewing images may be made by stacking waveguides. Such a panel may be thin in its depth compared to its height and width, and the cladding of the waveguides may be made black to increase the black surface area. It is known in the art that waveguide components are utilized for transmission of light. It is further known in the art that a waveguide has a central transparent core that is clad with a second material of a lower refractive index. In order to provide total internal reflection of light within this waveguide, the central core has a higher refractive index of refraction than the clad. By adjusting the difference in refractive index the acceptance angle of incoming light may be varied. The larger the difference in refractive index, the larger the incoming light acceptance angle.

However, optical waveguides of the step index cladding type have some significant drawbacks. In the formation of a large optical panel using stepped index clad waveguides many layers are stacked on top of each other and adhered to each other. In a typical 50" diagonal screen there may be several hundreds or even thousands of waveguides that are adhered to one another. Handling and cutting many strips of thin polymer is very difficult. The compatibility of materials that have a refractive index difference from core to clad is limited. This may contribute to problems such as inadequate adhesion between layers. Such an incompatible may result in layer to layer interface problems such as air gaps or rough surface or layer separation. These types of problems may cause a loss of light at each bounce at the interface between the core layer and surrounding cladding layers. Although the loss of light at each bounce within the optical waveguide may be small, a light ray may undergo a large number of bounces as it traverses the core layer. Therefore, the amount of light loss that occurs in optical panels becomes a significant detriment to the overall efficiency and performance of the optical panel, as well as the quality such as brightness, and sharpness of the image.

Since there are a limited number of materials that can be used in combination between the core and clad that provide the desired delta refractive index, provide adequate adhesion between the layers and are capable of absorbing ambient room light, it is important to have a means of controlling or modifying the refractive index of polymers to assure that both optical and physical characteristics are optimized. In stepped refractive index clad waveguides of the type described in U.S. Pat. Nos. 6,002,826, 6,301,417 and 6,307, 995, it is important to control or be able to modify the refractive index difference between two different materials or to modify the refractive index of a given material. If the difference is too large, the ambient light acceptance of the screen becomes large and does not appear to be black. There remains a need for improved control of refractive index as well as a broader selection of materials that can be used.

Ever since the seminal work conducted at Toyota Central Research Laboratories, polymer-clay nanocomposites have generated a lot of interest across industry. The utility of inorganic nanoparticles as additives to enhance polymer performance has been well established. Over the last decade or so, there has been an increased interest in academic and industrial sectors towards the use of inorganic nanoparticles as property enhancing additives. The unique physical properties of these nanocomposites have been explored by such varied industrial sectors as the automotive industry, the packaging industry, and plastics manufactures. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, solvent uptake, etc. Some of the related prior art is illustrated in U.S. Pat. Nos. 4,739,007; 4,810,734; 4,894,411; 5,102,948; 5,164,440; 5,164,460; 5,248,720; 5,854,326; and 6,034,163.

In general, the physical property enhancements for these nanocomposites are achieved with less than 20 vol. % addition, and usually less than 10 vol. % addition of the inorganic phase, which is typically clay or organically modified clay. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The clays in the polymer-clay nanocomposites are ideally thought to have three structures: (1) clay tactoids wherein the clay particles are in face-to-face aggregation with no organics inserted within the clay lattice; (2) intercalated clay wherein the clay lattice has been expanded to a thermodynamically defined equilibrium spacing due to the insertion of individual polymer chains, yet maintaining a long range order in the lattice; and (3) exfoliated clay wherein singular clay platelets are randomly suspended in the polymer, resulting from extensive penetration of the polymer into the clay lattice and its subsequent delamination. The greatest property enhancements of the polymer-clay nanocomposites are expected with the latter two structures mentioned herein above. Most of the work with nanoclays has been for physical properties modification.

PROBLEM TO BE SOLVED BY THE INVENTION

There is a continuing need for improved waveguides that have a broader selection of materials and where the difference in refractive index can be controlled more finely in a given material to optimize the incoming light acceptance from the light projector while minimizing the ambient light acceptance on the viewing side of the screen.

SUMMARY OF THE INVENTION

The invention provides a waveguide comprising a transparent polymeric central core clad externally with one or more polymeric layers, at least one of the core or clad layers containing layered particles disposed in a polymeric binder, wherein a majority of the particles have a lateral dimension less than 1 micrometer.

ADVANTAGEOUS EFFECT OF THE INVENTION

The invention provides a means to control or modify the refractive index of many polymers that when used in a stepped clad waveguide and enables a broader selection of materials that can be adhesively joined.

DETAILED DESCRIPTION OF THE INVENTION

The invention has numerous advantages. It provides layered particles of a size less than 1 micrometer which can be effectively incorporated with a polymer that results in the lowering of the refractive index of the base polymer. Such a material is very useful in the formation of optical panels that use stepped waveguides. The layered particles are typically intercalated clays and smectite materials that are either naturally occurring or synthetic.

Figure 1:
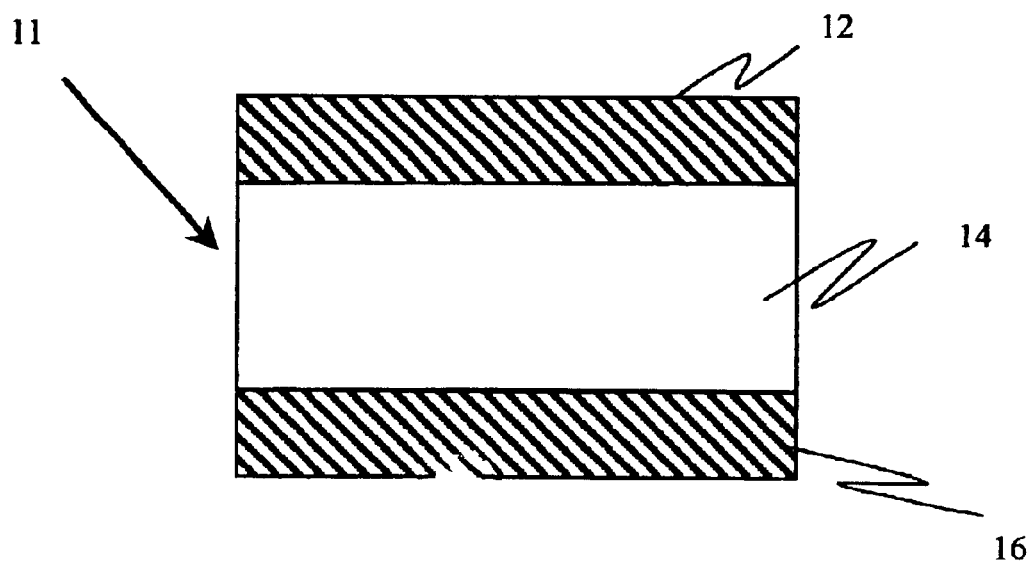
FIG. 1 is a schematic of a typical stepped clad waveguide with an opaque material in the clad.

For the purpose of this invention, FIG. 1 is a waveguide 11 that has a transparent core 14 and is surrounded by clad 12 on the top and clad 16 on the bottom. The refractive index of the core is higher than either clad 12 or 16. It is preferable for clads 12 and 16 to be the same refractive index value. A waveguide as shown in FIG. 1 has a uniform refractive index throughout in the transparent core 14 and a lower but uniform refractive index in the clads 12 and 16.

Figure 2:
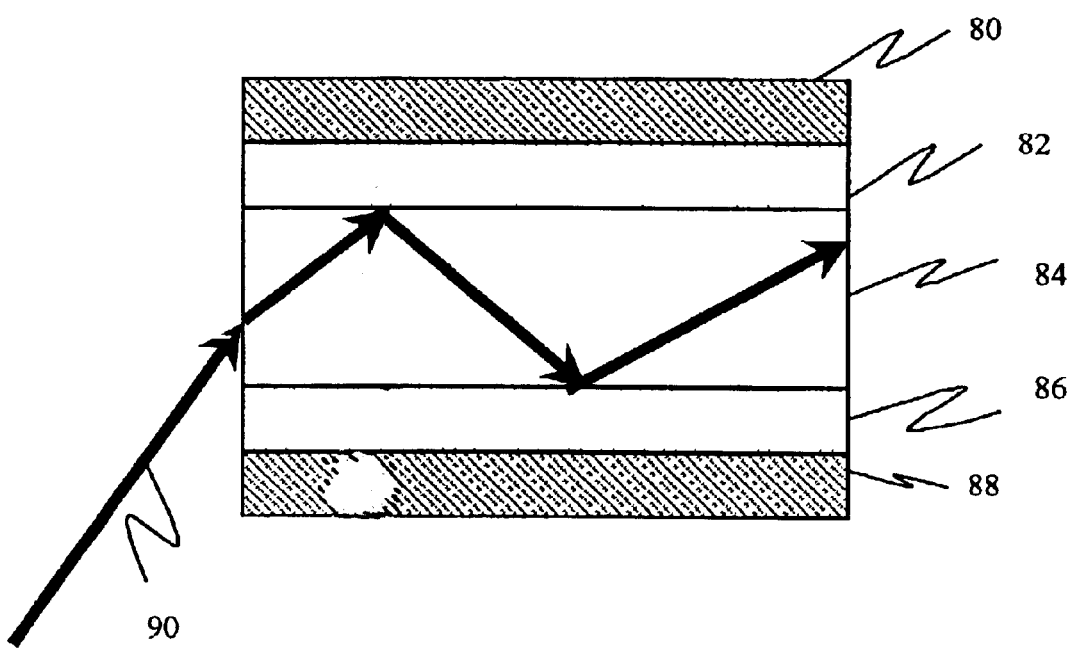
FIG. 2 is a schematic of a stepped clad waveguide in which the clad is clear and there is a separate black adhesive layer.

FIG. 2 is another type of waveguide in which there is transparent core 84 with separate clear top cladding layers 82 and separate clear bottom cladding layers 86 on each side of core 84. Layers 82 and 86 have a lower refractive index than core 84. Black layers 80 and 88 are black adhesive layers. Light ray 90 is reflected through the waveguide.

Figure 3:
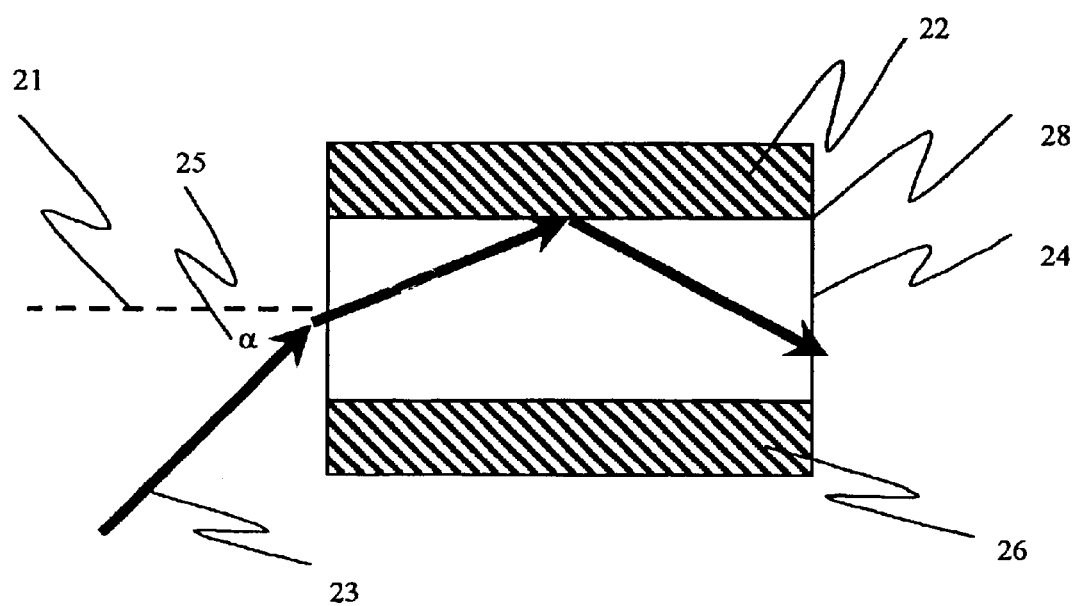
FIG. 3 is a schematic of an optical panel.

In simple terms, the action of a waveguide can be partially understood by considering FIG. 3. A light-wave entering the waveguide is either refracted into the cladding, and attenuated (absorbed), or is totally internally reflected at the core/cladding boundary. In this manner light travels along the length of the waveguide. The maximum angle at which it may enter the transparent core and travel by total internal reflection is termed the acceptance angle. FIG. 3 is a clad waveguide with an imaginary line (dotted line) 21 normal to the face of the transparent core 24 with top black clad layer 22 and bottom black clad layer 26. Light ray 23 enters the transparent central core 24 at some angle off axis 25 ($\alpha$) from the imaginary normal 21. Since the refractive index of air is 1 and transparent core 24 is a polymer with a higher refractive index, light ray 23 bends towards the normal. Light ray 23 continues until it hits the interface 28 between clad 22 and core 24. The refractive index of clad 22 and clad 26 are the same and are lower than the refractive index of core 24. Light ray 23 reflects back into the core 24 and works its way out of the core. This process is referred to as total internal reflection within the waveguide. The larger the difference in refractive index between core 24 and clads 22 and 26, the larger the acceptance angle into the waveguide. If the incoming angle 25 of light ray 23 is too steep, the light ray will not reflect at the interface 28 and will travel into clad 22 and be absorbed.

Figure 4:
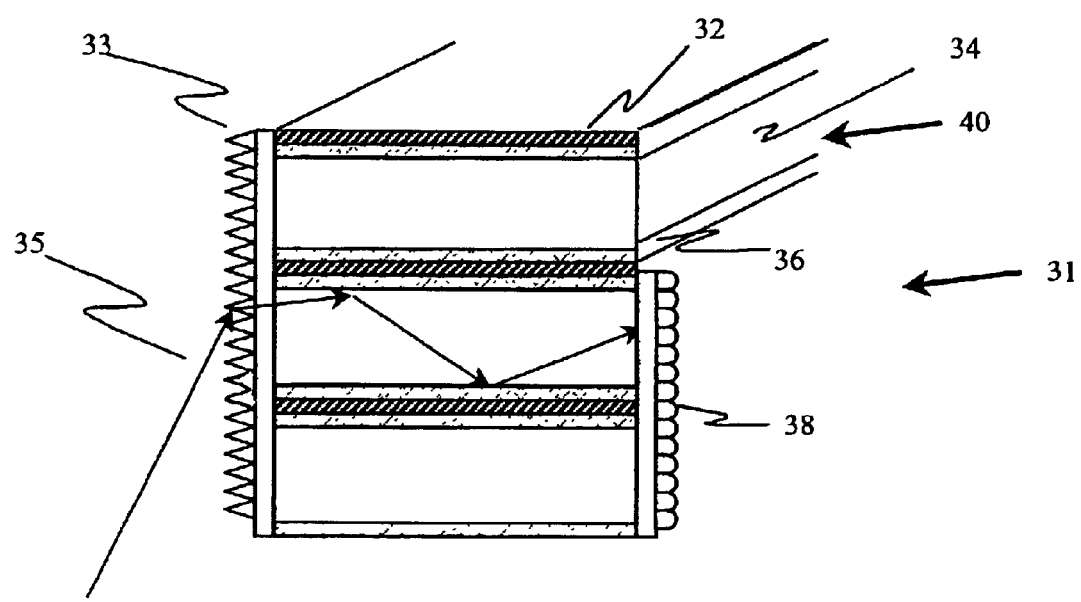
FIG. 4 is a schematic of a stacked waveguide with black clad layer that absorb ambient room light from the viewing side of the waveguide.

FIG. 4 is an optical panel 31 used as a rear projection screen and is made from several single waveguides 40 stacked and adhered together. Waveguide 40 also has black adhesive layer 32 and a clear cladding layer 36 with a lower refractive index than the core 34. Optical panel 31 depicts three stacked waveguides 40, but in a typical rear projection screen there would be several hundred waveguides that are stacked and adhered together in a vertical or horizontal manner. Optical panel 31 furthermore has a light directing film 33, which is used to turn light rays 35 arriving in a shallow entrance angle into core 34. Additionally, the optical panel 31 also has a light shaping film 38 on the viewing side of the panel or screen. The light shaping film is used to spread light in a horizontal and vertical viewing direction as the light exits the optical panel.

The behavior of light entering a material is fundamentally controlled by the property of the material. Perhaps the most important thing for understanding waveguiding is to understand the refractive index. The refractive index of a material is the ratio of the velocity of propagation of an electromagnetic wave in vacuum to its velocity in the material. The refractive index (n) of a substance is defined as:

$$n = V_v/V$$

where $V_v$ is the velocity of light in a vacuum, and V is the velocity of light in the material. In general light slows down when it enters a substance, so the refractive index will always be greater than 1. Most materials have refractive indices between 1.32 and 2.40, with values between 1.40 and 1.80 being of the most interest for this invention. In should also be noted that the refractive index of some materials is not necessarily the same in all directions. The internal symmetry of a material is a result of the orientation of atoms into layers. The arrangement of the atoms determines how light interacts with the material. Two basic types of behavior are exhibited:

1. Isotropic—same properties (refractive index) in all directions exhibit the same physical properties regardless of where the light enters the material.
2. Anisotropic—different properties (different refractive index) in different directions. These materials are either a) uniaxial and have two refractive indices in the length direction and width of a sheet or b) biaxial and havethree refractive indices. These materials add a third refractive index in the thickness plane of the material.

Figure 6:
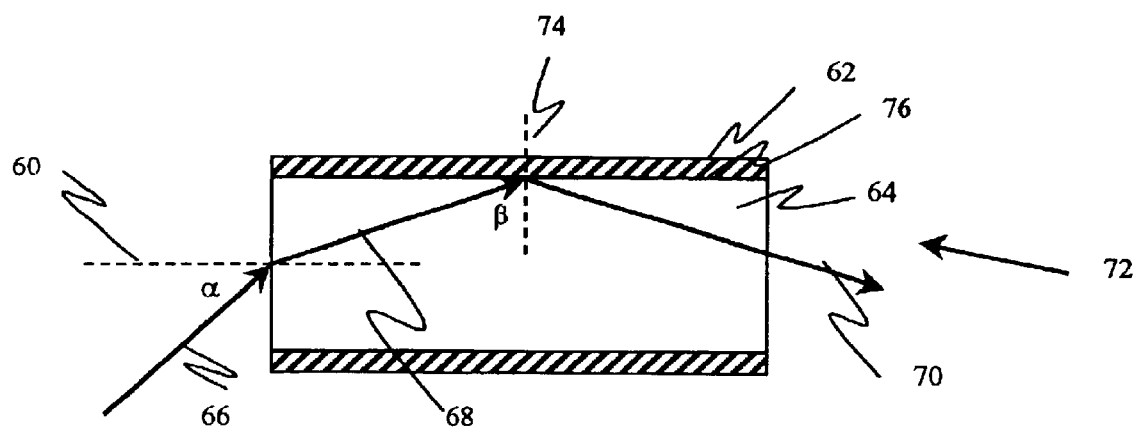
FIG. 6 is a schematic of an optical panel formed by a waveguide and shows the ability of the planar waveguide to absorb some ambient room light.

Light entering a wavequide follows Snell's law. Snell's law of geometric optics defines the amount of bending that takes place when a light ray strikes a refractive boundary, e.g., an air-glass interface or the interface of two different polymer, at a non-normal angle. Snell's law as exhibited in FIG. 6 states that where $n_{air}$ is the index of refraction of the material in which the light ray travels, α is the angle, with respect to the normal at the refractive boundary, at which the light ray strikes the boundary, $n_r$ is the index of refraction of the material in which the refracted ray travels, and b is the angle, with respect to the normal at the refractive boundary, at which the refracted ray travels. The light ray and refracted ray travel in the same plane, on opposite sides of the normal at the point of incidence. If a ray travels from a material of lower refractive index into a medium of higher refractive index, it is bent toward the normal; if it travels from a medium of higher refractive index to a medium of lower index, it is bent away from the normal. If the light ray travels in a material of higher refractive index toward a material of lower refractive index at such an angle that Snell's law would call for the sine of the refracted ray to be greater than unity (a mathematical impossibility). As a result, the "refracted" ray in actuality becomes a reflected ray and is totally reflected back into the medium of higher refractive index, at an angle equal to the incident angle (and thus still "obeys" Snell's Law). This reflection occurs even in the absence of a metallic reflective coating (e.g. aluminum or silver). This phenomenon is called total internal reflection. The smallest angle of incidence, with respect to the normal at the refractive boundary, which angle will support total internal reflection, is called the critical angle. In other words total internal reflection is the reflection that occurs when light, in a higher refractive index material, strikes an interface, with a medium with a lower refractive index, at an angle of incidence (with respect to the normal) greater than the critical angle.

Snell's Law $n_{air}*\sin \alpha = n_r*\sin \beta$

The critical angle is defined in geometric optics as the smallest angle of incidence at which total internal reflection occurs. The angle of incidence is measured with respect to the normal at the refractive boundary. The critical angle is given by $\beta = \sin^{-1}(n_c/n_r)$ where b is the critical angle, $n_c$ is the refractive index of the less dense material and $n_r$ is the refractive index of the denser medium.

Geometric optics is the branch of optics that describes light propagation in terms of rays. Rays are bent at the interface between two dissimilar materials. A refracted ray is a ray that undergoes a change of velocity, or in the general case, both velocity and direction, as a result of interaction with the material in which it travels.

The speed of light is not constant. It varies as it passes through different transparent substances. Light travels more slowly through air than it does through the vacuum of empty space, more slowly through water than air, slower yet through quartz, and slower yet through diamond. The speed of light is equal to its wavelength times its frequency. As light passes through different substances or materials (polymers) its frequency remains constant and its wavelength changes. This change of wavelength (speed) at the surface interface between different materials causes light passing through one and into the other to be bent.

Figure 5:
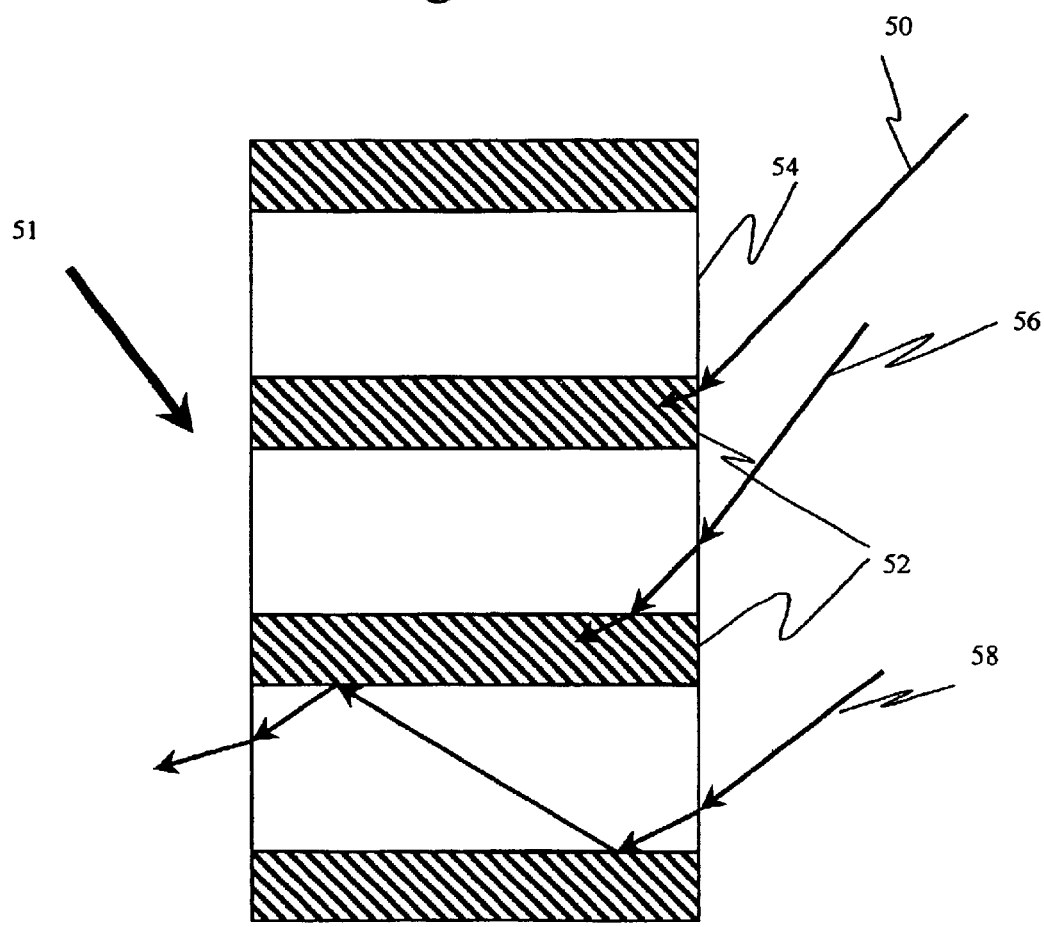
FIG. 5 is a schematic of a waveguide and shows the effect of Snell's Law.

FIG. 5 is a representation of stacked waveguide 51 and demonstrates the effect of the black clad 52 and its ability to absorb some ambient room light that exceeds the critical angle while other ambient room light that is below the critical angle is transmitted through the waveguide to the projection side of the panel. FIG. 5 is an optical panel with a waveguide formed by core 54 and black adhesive clad 52 that have a lower refractive index than core 54. Light rays 50 and 56 are ambient room light that impinge the black clad 52 or core 54 and then black clad 52 from the viewing side of the waveguide. Light rays 50 and 56 are above the critical angle and are therefore absorbed in the black cladding. Light ray 58 is also ambient room light on the viewing side but enters the core 54 below the critical angle and is therefore reflected at the boundary formed by core 54 and black clad 52. The light ray continue down the core 54 until it exits on the light projector side of the waveguide 51.

The refractive index for any substance is the ratio of the velocity of light in a vacuum to its velocity in the substance. It is also the ratio of the sine of the angle of incidence to the sine of the angle of refraction ASTM D642. Some typical refractive indexes of material are: Fluorcarbon (FEP) 1.34-Polytetrafluoro-Ethylene (TFE) 1.35, Chlorotrifluoro-Ethylene (CTFE) 1.42, Cellulose Propionate 1.46, Cellulose Acetate Butyrate 1.46–1.49, Cellulose Acetate 1.46–1.50, Methylpentene Polymer 1.485, Ethyl Cellulose 1.47, Acetal Homopolymer 1.48, Acrylics 1.49; Cellulose Nitrate 1.49,-1.51, Polypropylene (Unmodified) 1.49, Polyallomer 1.492, Polybutylene 1.50, Ionomers 1.51, Polyethylene (Low Density) 1.51, Nylons (PA) Type II 1.52, Acrylics Multipolymer 1.52, Polyethylene (Medium Density) 1.52,.-Styrene Butadiene Thermoplastic 1.52–1.55, PVC (Rigid) 1.52.-1.55, Nylons (Polyamide) Type 6/6 1.53, Urea Formaldehyde 1.54–1.58, Polyethylene (High Density) 1.54,-Styrene Acrylonitrile Copolymer 1.56–1.57, Polystyrene, 1.57–1.60, Polycarbornate (Unfilled) 1.586, and-Polystyrene 1.59. As can be noted from this information many polymers that might be used for waveguiding have refractive indexes that are fairly close together.

As the difference in refractive index between the core and clad of a waveguide becomes larger, the greater the acceptance angle of light entering the waveguide. That is, light entering from steeper angles can be totally internally reflected without being absorbed. When the refractive index difference between the core and the clad becomes smaller, less light will be totally internally reflected. This becomes important in that the selection of compatible materials is limited. In order to make a waveguide useful for rear projection or other applications, the core and clad material must adhere to each other. Additionally it is desirable to have a black dye or pigment in the clad. Finding materials that adhere to each other and have an optimal difference in refractive index is difficult.

Additionally it should be noted that the optimization of a waveguide's performance for a rear projection screen that will also minimize ambient room light from entering the waveguide from the viewing side of the screen is to have a controlled difference in the refractive index between the core and the clad. Unmodified polymers have limited versatility for this application. Having the ability to control or modify the refractive index of polymer is very important and useful when designing waveguide screens. Surprisingly, it has been found that by controlling the concentration of nanoclays in a polymer martix, there is a wide range of control of the refractive index between the polymer and the nanoclay. The nanoclays of this invention help to lower the refractive index of the polymer. In this case the same polymer can be used for the core and the cladding and therefore adhesion problems are no longer a concern. Furthermore the control of both incoming light angle acceptance from the light engine and ambient room light from the viewing side can optimized. This discovery also allows the modification of refractive index of different polymers for the core and cladding.

Whenever used in the specification the terms set forth shall have the following meaning:

"Nanocomposite" shall mean a composite material wherein at least one component comprises an inorganic phase, such as a smectite clay, with at least one dimension in the 0.1 to 100 nanometer range.

"Plates" shall mean particles with two comparable dimensions significantly greater than the third dimension.

"Layered material" shall mean an inorganic material such as a smectite clay that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,554,670.

"Intercalant" shall mean the aforesaid foreign molecule inserted between platelets of the aforesaid layered material.

"Exfoliation" or "delamination" shall mean separation of individual platelets in to a disordered structure without any stacking order.

"Polymer" shall include oligomers, copolymers and interpolymers

"ionomer" are polymers in which the linkages are ionic as well as covalent bonds. There are positively and negatively charged groups that are associated with each other and this polar character makes a unique resin.

"organically modified" shall mean the addition of an organic material or organic end group.

"Top" and "bottom" side of an imaging support shall refer to the side bearing the imaging layer(s) and the opposite side, respectively.

"lateral", "width", and "thickness" refer to the three dimensions of the nanoparticles in decreasing size.

Phyllosilicates such as those described in U.S. Pat. Nos. 4,739,007; 4,810,734; 4,889,885; 4,894,411; 5,102,948; 5,164,440; 5,164,460; 5,248,720; 5,973,053; 5,578,672; and incorporated herein by reference are preferred layered particles for the invention, because of their availability and cost. Particularly preferred phyllosilicates are those, which are fluorinated because of their desirable refractive index value. It is known that phyllosilicates, such as smectite clays, e.g., sodium montmorillonite and calcium montmorillonite, can be treated with organic molecules such as ammonium ions to intercalate the organic molecules between adjacent planar silicate layers and/or exfoliate the individual silicate layers. These silicate layers when admixed with a host polymer before, after or during the polymerization of the host polymer have been found (vide U.S. Pat. Nos. 4,739,007; 4,810,734; and 5,385,776) to improve one or more properties of the polymer, e.g., mechanical strength and/or high temperature characteristics. Phyllosilicates suitable for the present invention include smectite clay, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof.

Additional clay based useful layered particles include illite, mixed layered illite/smectite minerals, such as ledikite and admixtures of illites with the clay minerals named above. The aforesaid clay based materials are described in detail in relevant literature, such as "Clay Colloid Chemistry" by H. van Olphen, $2^{nd}$ Ed., Publishers:John Wiley & Sons, (1977). Other useful layered particles, particularly useful with anionic polymers, are the layered hydrotalcites or double hydroxides, such as $Mg_6Al_{3.4}(OH)_{18.8}(CO_3)_1$ $7H_2O$, which have positively charged layers and exchangeable anions in the in the interlayer spaces. Yet other useful layered particles include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4$—$2H_2O$, $Zr(HPO_4)_2$—$2H_2O$, $CaPO_4CH_3$—$H_2O$, $MnHAsO_4$—$H_2O$, $Ag_6Mo_{10}O_{33}$ and the like.

Particularly preferred layered particles are those which are fluorinated because of their desirably low refractive index values. Preferred layered particles can be swellable so that other agents, such as ions or molecules, can intercalate and/or exfoliate the layered particle resulting in a desirable dispersion of the inorganic phase. These swellable layered particles include phyllosilicates of the 2:1 type having a negative charge on the layers and a commensurate number of exchangeable cations in the interlayer space to maintain overall charge neutrality. Typical phyllosilicates with cation exchange capacity of 50 to 300 milliequivalents per 100 grams are preferred. Most preferred layered particles for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as hydrotalcites, chalcogenites and oxides.

The aforementioned smectite clay can be natural or synthetic. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the clay particles should have a lateral dimension of between 0.01 $\mu$m and 1 $\mu$m, desirably between 0.01 and 0.4 $\mu$m, and suitably between 0.01 $\mu$m and 0.05 $\mu$m. The thickness or the vertical dimension of the clay particles can vary but is preferably between 0.5 nm and 10 nm, and more preferably between 1 nm and 5 nm. The aspect ratio, which is the ratio of the largest and smallest dimension of the clay particles should be at least 10:1 and up to 1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers. Aspect ratio of less than 10:1 may be difficult to obtain and may have limited utility for the added expense. Preferred aspect ratio for the clay for this invention is between 20:1 and 200:1, for optimum properties.

The clay used in this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, such as Southern Clay Products and Nanocor, which may be used in the practice of this invention.

The smectite clay of the invention can also be further treated with a compatibilizing agent. The purpose of the compatibilizing agent is to render the inorganic clay phase compatible with the binder polymer in which the clay is preferably dispersed. Typically, the compatibilizing agent comprises a component that bonds with the clay surface and another component that interacts favorably with the binder polymer. Effective compatibilization leads to a homogenous dispersion of the clay in the binder polymer.

Intercalants and compatibilizers, which can also be an intercalants, can vary widely depending on the particular polymer and the particular clay material chosen. Examples of various types of intercalants and compatiblizers useful for treating the preferred smectite clay of this invention are included in, but not limited to, the disclosures of U.S. Pat. Nos. 4,739,007; 4,810,734; 4,889,885; 4,894,411; 5,102,948; 5,164,440; 5,164,460; 5,248,720; 5,973,053; 5,578,672; 5,698,624; 5,760,121; 5,804,613; 5,830,528; 5,837,763; 5,844,032; 5,877,248; 5,880,197; 6,057,396; 5,384,196; 5,385,776; 5,514,734; 5,747,560; 5,780,376; 6,036,765; 6,034,163; 6,084,019; 5,952,093; which are incorporated herein by reference.

The waveguide of this invention contains a transparent polymeric central core that is clad externally with one or more polymeric layers with at least one of the core or clad layer containing layered particles disposed in a polymeric binder, wherein a majority of the particles have a projected size less than 1 micrometer. Layered particles may be in either the central core or the clad. It should be noted that for a waveguide to reflect light back into the core and therefore transmit it through the length of the waveguide with minimal loss, the refractive index of the clad layer should be lower than the refractive index of the central core. By placing layered particles that have a thickness dimension of between 0.5 and 10 nm, it has been demonstrated that the refractive index of the polymer may be reduced.

In a further embodiment of this invention the core is planar in shape. By providing a sheet like waveguide this invention may be used as a rear projection screen. Light from a projection source may be directed into the core of the waveguide either directly or by use of a light director such as a fresnel lens or a light directing shape such triangular right angle reflector as sold by 3M company under the name a Vikuiti. It should also be noted that typical rear projection screens may have a diffusion screen or light shaper on the viewing side to optimize the viewing angle of the screen in either the vertical and or horizontal viewing planes.

In an additional embodiment of this invention the core may cylindrically in shape. This is use for application as an optical fiber. In this case the lower refractive index clad surrounds the transparent core.

The binder polymer in which the layered particles, particularly the smectite clays, are preferably dispersed can comprise a wide variety of polymers. Specifically, the binder polymer can comprise a water soluble polymer, hydrophilic colloid or water insoluble polymer, for application from an aqueous or organic solvent based coating composition. Alternatively, the binder polymer can comprise thermally processable thermoplastic or thermosetting polymers, for application from a thermally processable melt.

The water soluble polymers can preferably comprise polyalkylene oxides such as polyethylene oxide, poly 6, (2-ethyloxazolines), poly(ethyleneimine), poly(vinylpyrrolidone), poly(vinyl alcohol), poly (vinyl acetate), polystyrene sulfonate, polyacrylamides, polymethacrylamide, poly(N,N-dimethacrylamide), poly(N-isopropylacrylamide), polysaccharides, dextrans or cellulose derivatives such as carboxymethyl cellulose, hydroxyethyl cellulose, and the like. Water soluble polymers provide the advantage of an environmentally attractive coating composition. Also, a number of these water soluble polymers can also intercalate the clay, thus, providing a uniform dispersion.

The hydrophilic colloid can preferably comprise gelatin or gelatin grafted polymers. The aforementioned gelatin may comprise, for example, alkali-treated gelatin (cattle bone or hide gelatin), acid-treated gelatin (pigskin or bone gelatin), and gelatin derivatives such as partially phthalated gelatin, acetylated gelatin, and the like, and preferably the deionized gelatins. Gelatin and gelatin based polymers are particularly attractive because of their relatively low cost and ability to intercalate clays.

The water insoluble polymers can comprise polymers soluble in organic solvents or polymers in the form of aqueous dispersions or latexes. Such polymers can preferably comprise polymers of styrene and styrene derivatives, alkyl acrylate, alkyl methacrylate and their derivatives, olefins, acrylonitrile, acrylic acid, methacrylic acid, maleic acid, itaconic acid, vinyl acetate, vinyl halide, vinylidene halide, cellulose esters such as cellulose acetate and cellulose acetate butyrate, polyurethane, polyester and polyester ionomer. The aforesaid water insoluble polymers can provide useful physical properties, such as adhesion to adjacent layers, toughness, compatibility with organic solvents, etc. A particularly suitable water dispersible polymer comprises polyester ionomer for its excellent film forming characteristics, compatibility with smectite clay and commercial availability.

The thermally processable polymer can be a thermoplastic or a thermosetting polymer. Thermosetting polymers provide an added advantage because they typically are good adhesives and therefore may stick well to a variety of core materials. Thermally processable polymeric materials can comprise polyester, polyolefin, polyurethane, polyamide, polyimide, polycarbonate, polystyrene, polymethyl methacrylate, cellulose esters, polyether, and polyvinyl alcohol. The addition of layered particles to thermally processable polymers can modify their refractive index. Being able to use the same polymer for the core and the clad while being able to lower the clad refractive index from that of the core is very useful particular for adhesion between the layers. Additionally, when more than one layer is being coated at the same time, being able to use the same base polymers in both layers provides improved layer stability and will result in minimal interface problems. Thermally procressable polymers are useful as waveguides because the clad may be coextruded or cocast as a separate layer simultaneously with the core. This provides very smooth interface between the layers that will have minimal refraction losses has light travel from the core to the clad layer. These materials provide excellent optical properties for the transmission of images for use as waveguides.

Other materials that are useful as binder polymers in waveguides are radiation curable and may be selected from the group of those containing an acrylate, epoxy and isobutylene moiety. Radiation curable materials provide excellent adhesion between materials and are easily coated on and cured. These materials are also very durable when cured and are able to within a range of temperatures and humidity.

In general, the choice of the binder polymer in the clad layer may depend on the choice of the core. As a rule of thumb, the binder polymer in the clad should be the same or similar to the polymer in the core to ensure good adhesion, although exception to this rule may abound. As per the invention, the layered particles when dispersed in the binder polymer of the clad, reduces its refractive index, without significantly altering its adhesion to the core. The choice of the core material depends on a number of criteria: the optical properties such as refractive index and transparency, physical properties, dimensional stability, ease of manufacture, availability, cost and the like. Preferred core material can comprise a cellulose derivative such as cellulose acetate or cellulose acetate butyrate, or polyesters, including amorphous or crystalline polyesters such as polyethylene terephthalate, and polyethylene naphthalate, mainly because of their excellent optical properties, availability, and relatively low cost. Preferred binder polymers in the clad layer for a cellulosic core, are cellulose derivatives such as carboxymethyl cellulose, hydroxyethyl cellulose, cellulose acetate, and cellulose acetate butyrate. Similarly, preferred binder polymers in the clad layer for a polyester core are polyesters such as polyester ionomers.

In one embodiment of this invention the binder polymer may further comprise an opaque material and in a preferred embodiment the opaque material is black. Black opaque materials are preferred because they absorb ambient room light and therefore provide improved viewability of the image when used as a rear projection screen. Additional the black layer helps to absorb light and prevents light entering above the critical angle from transmitting through into another waveguide. The opaque material may have a percent transmission from 0 to 30%. In general the lower the percent transmission the better. Opaque materials with 0% transmission are totally absorbing and are therefore more efficient than those that have a higher percent transmission. Opaque materials with a percent transmission greater than 30% will provide some degree of absorbency but are less efficient and therefore do not absorb as much light. In a preferred embodiment of this invention the opaque material has a percent transmission of from 10 to 25%. While it is recognized that there are materials that can provide total absorbency, obtaining absorbency of less than 10% transmission are more difficult and typically require higher material loadings and or greater thicknesses of the layers containing the opaque material. This becomes more expensive and if the layer is to thick the percent open area between the clear core and the absorbing layer may be lowered to the point that it becomes objectionable and interferes with viewing an image on the screen. Opaque materials that have a percent transmission greater than 25% will allow more ambient light to reflected back to the viewer and will therefore diminish the viewability of the screen.

The planar waveguides of this invention may have a transparent central core and clad layer that have a thickness ratio of from 20:1 to 5:1. A thickness ratio of from 20:1 to 5:1 provides excellent viewability by providing enough open area for viewing yet enough thickness in the clad to absorb ambient room light. While a core to clad ratio greater than 20:1 is useful, the clad becomes sufficiently thin such that the ambient room light is reduced making the screen less desirable. When the core to clad thickness ratio is greater than 5:1, the percent open area is reduced and the opaque clad will then to interfere with the screen's viewability.

Waveguides useful in this invention may have a transparent central core that comprises at least one material selected from the group consisting of polyester, cellulose acetate, polycarbonate, polymethylmethacrylate, cyclic olefins and copolymers thereof. These materials are useful because they have excellent optical properties and will transmit light with minimal distortion or absorption of light. To provide good viewing characteristics the transparent central core should have a percent transmission of between 80 to 100%. Transmissions less than 80% absorb or scatter more light and will reduce the overall brightness of the waveguide. The core may be provided with a primer or tie layer to enhance adhesion of the clad layer on to the core.

In order for a waveguide to transmit light, the clad needs to have a refractive index less than that of the core. In an embodiment of this invention the transparent central core and polymeric binder layers has a refractive index difference of from 0.001 to 0.35. In a preferred embodiment of this invention the transparent central core and one or more polymeric binder layers has a refractive index difference of from 0.01 to 0.30. A refractive index difference of less than 0.01 have a very narrow acceptance angle for incoming light and will only transmit light through the central core that enters in a very narrow angle. While this may be useful for absorbing ambient room light, it also requires that light from image projection source be directed into the waveguide in a very narrow angle. Without the use of a fresnel or other type light director, the light source needs to be aligned in a narrow field in order for light to be viewed. On the other hand, if the refractive index difference between the transparent central core and one or more polymeric binder layers is greater than 0.30, the waveguide will accept light from a broader source and transmit in back into the rear projection screen where it will bounce around and may reenter the waveguide from the projection side of the screen.

In another useful embodiment of this invention the waveguide may have a transparent central core and one or more polymeric binder layers with a refractive index of from 1.0 to 2.4. Central cores and polymeric binders layers with a refractive index of from 1.0 to 2.4 provide a wide choice of materials that may provide optimum performance of the waveguide screen. Materials with a refractive index of less than 1.0 are not available while materials with a refractive index of greater than 2.4 are expensive and have limited usefulness as a waveguide.

In another embodiment of this invention the layered particles have a thickness of from 0.5 to 10 nm. While particles less 0.5 nm may be useful, it is hard to work with very thin particles and to achieve the desired refractive index modification with layered particles, there needs to be a de-spacing of several particles layers while particles that have a thickness of greater than 10 nm will become less effective and may tend to scatter more light.

Layered particles may be added to either the central core or the clad layers or to both layers in order to adjust the refractive index of the polymer. The concentration of the layered particles within the polymer has a biggest effect on the refractive index. A useful concentration of layered particles disposed in a polymeric binder has a weight percent of 1 to 90%. The higher the concentration of layer particles, the greater the refractive index change. Since the layered particles have a lower refractive index than the base polymer as the concentration is increased is increased the lower the refractive index. In this manner both the core and clad may contain particles and the concentration may be adjusted to achieve the desired refractive index difference. A concentration greater than 90% tends to have less useability in the central core because the layer will tend to be less clear reduce the viewing efficient of the layer. Higher levels in the clad may tend to have lower cohesive strength because there are more particles and less binder polymer. Polymeric binder with less than 1% layered particles tend to have lower refractive index efficient and therefore may not be as useful for modifying the refractive index of the polymer for the added expensive of adding them to the polymer. In a preferred embodiment of this invention the clad layer may containing layered particles disposed in a polymeric binder has a weight percent of 1 to 90% of the clad layer. Adding the layered particles to the clad layer alone is more desirable because if the particles are not sufficiently dispersed or if they form aggravates, light may tend to be scattered and the overall viewability of the waveguide screen will be reduced.

Embodiments of the invention may additionally provide a means to control the incoming light from the light engine while maximizing ambient light rejection.

The following examples illustrate the practice of this invention. They are not intended to be exhaustive of all possible variations of the invention. Parts and percentages are by weight unless otherwise indicated.

EXAMPLES

The materials used in the examples and comparative samples of the invention include the following.

Layered Particles

Laponite S is a fluorinated synthetic clay comprising hydrous magnesium lithium silicate supplied by Southern Clay Products, with the following composition (weight %) as per the product bulletin:

| | |
|---|---|
| $SiO_2$ | 50–52 |
| MgO | 22–24 |
| $Li_2O$ | 1.1–1.4 |
| $Na_2O$ | 6.0–8.0 |
| $P_2O_5$ | 3.3–5.5 |
| F | 4.7–5.2 |
| Loss on ignition | 8.5–9.0 |

Laponite RDS is a synthetic clay comprising hydrous magnesium lithium silicate supplied by Southern Clay Products, with the following composition (weight %) as per the product bulletin.

| | |
|---|---|
| $SiO_2$ | 55–56 |
| MgO | 25–27 |
| $Li_2O$ | 0.8 |
| $Na_2O$ | 5.4–5.8 |
| $P_2O_5$ | 4.0–4.2 |
| Loss on ignition | 8.0 |

The lateral dimension of Laponite S and RDS can be evaluated by cryo-transmission electron microscopy (cryo-TEM) technique. In this technique, a dilute aqueous sol of Laponite is frozen and subsequently imaged by TEM under cryogenic conditions. The technique allows for direct viewing of dispersed layered particles. Such analysis resulted in an approximate ECD (lateral dimension) of 0.02 to 0.04 μm for Laponite RDS particles, with some degree of dispersity.

Binder Polymer

AQ55 is an aqueous dispersible polyester ionomer supplied by Eastman Chemicals.

Aqueous coating compositions comprising materials described herein above are spin-coated on silicon wafers, for refractive index measurement.

The thickness and optical characterization of the thin films of the invention can be carried out by using any convenient means, including, by way of example only, a variable angle spectroscopic ellipsometer (VASE), obtained for example, from the J. A. Woollam Company. The wavelengths of light to be used can vary from about 400 nm to about 1000 nm and three angles, 65°, 70° and 75° normal to the sample can be typically used. The parameters obtained from VASE can be delta and psi, which are trigonometric parameters which define the resultant ellipsoid after linearly polarized light is ellipsometrically polarized after interacting with the thin film. A Cauchy model and other oscillator models can be fit to delta and psi to derive a thickness value and dispersion curves for the indices of refraction and the extinction coefficients for organic polymer films on silicon substrate. Data are reported at 589 nm.

The refractive index data for layers containing varying amounts of Laponie S dispersed in AQ55 are compiled in Table 1.

TABLE 1

| Sample | Layer Composition Laponite S: AQ55 (wt. ratio) | Refractive index |
|---|---|---|
| 1 | 0:100 | 1.56 |
| 2 | 5:95 | 1.56 |
| 3 | 10:90 | 1.55 |
| 4 | 20:80 | 1.53 |
| 5 | 40:60 | 1.52 |
| 6 | 50:50 | 1.50 |
| 7 | 60:40 | 1.49 |
| 8 | 70:30 | 1.48 |
| 9 | 80:20 | 1.47 |
| 10 | 90:10 | 1.46 |
| 11 | 95:5 | 1.42 |

It is clear from the data in Table 1 that with increasing weight fraction of Laponite S dispersed in AQ 55, the overall refractive index of the layer gets reduced, showing the efficacy of the layered particles of the invention in reducing the refractive index of a water dispersible polyester matrix. Since oriented polyethylene terephthalate sheets typically attains a refractive index of greater than 1.6 depending of degree of orientation, any of the layers of samples (2–11) can serve as an effective clad layer of lowered refractive index for an oriented polyethylene terephthalate core.

The refractive index data of Laponite S and Laponite RDS, without any binder polymer, are compared in Table 2. Note that Laponite S and Laponite RDS are very similar in composition except that Laponite S is fluorinated.

TABLE 2

| Layered particle | Refractive index |
|---|---|
| Laponite RDS (un-fluorinated) | 1.44 |
| Laponite S (fluorinated) | 1.40 |

It is clear that Laponite S has a lower refractive index than Laponite RDS, demonstrating the desirability of a fluorinated smectite for the practice of the present invention.

Example of Waveguide Component

A waveguide component as per the present invention is constructed as follows.

The core of the waveguide component comprises a ~120 μm thick polyethylene terephthalate or PET film base with adhesion promoting subbing layer of vinylidene chloride-acrylonitrile-acrylic acid terpolymer. On each side of the PET film base is coated a ~1 μm thick (dry) clad layer, comprising Laponite S as the layered particle and AQ55 as the binder polymer. The coating is made from an aqueous coating composition using an X-hopper and thoroughly dried. The Laponite S: AQ55 weight ratio in the clad layer is 30:70.

The refractive index of the PET core is 1.68 and that of the clad layer is 1.52.

Above the clad layer, is coated a ~2 μm thick (dry) black adhesive layer comprising a black dye and a co-polyester resin.

The layer arrangement of the waveguide component described herein above is similar to the schematic of FIG. 1A.

The waveguide component described herein above is thermally laminated to itself at 160° C. using dual-heated silicone rubber-nip. The laminate thus made is tested for peel strength after 24 hours, with the locus of failure observed in the PET base. This result demonstrates excellent interlayer adhesion in the waveguide component, prepared as per the invention.

The invention has been described in detail with particular reference to certain preferred embodiments thereof, but it will be understood that variations and modifications can be effected within the scope of the invention.

The entire contents of the patents and other publications referred to in this specification are incorporated herein by reference.

PARTS LIST 11 waveguide consisting of a transparent core and a cladding on each side
12 top cladding layer that has a lower refractive index than the transparent core and contains black light absorbing materials and also contains adhesive
14 transparent core of a waveguide
16 bottom cladding layer that has a lower refractive index than the transparent core and contains black light absorbing materials and also contains adhesive
21 imaginary normal of the transparent core
22 top cladding layer that has a lower refractive index than the transparent core and contains black light absorbing materials and also contains adhesive
23 light ray that is broken into segments that reflects off the cladding and travel through the transparent core
24 transparent core of a waveguide
25 angle formed by light ray 23 as it enter the transparent core and the imaginary normal lines of the transparent core
26 bottom cladding layer that has a lower refractive index than the transparent core and contains black light absorbing materials and also contains adhesive
28 interface of the cladding layer and the transparent core
31 optical panel used as a rear projection waveguide screen consisting stacked waveguides, light directing film on the input side of the screen and light shaping film on the viewing side of the screen
32 black light absorbing layer that contains adhesive
33 light directing film or fresnel lens that changes the angle of light entering the transparent core of the waveguide
35 light ray that is broken into segments that changes direction as it enters the light directing film and then reflects off the cladding layer
36 clear cladding layer that has a lower refractive index than the transparent core -continued

PARTS LIST 38 light shaping film that spreads the light in a horizontal and vertical direction
40 single waveguide
50 light ray on the viewing side of a screen that hits the black clad of the waveguide
51 stacked waveguide rear projection screen
52 black cladding layer
54 transparent core of a waveguide
56 light ray on the viewing side of a screen that hits the black clad of the waveguide
58 light ray from ambient room light that enter the core below the critical angle.
60 imaginary normal of the transparent core
62 top cladding layer that has a lower refractive index ($n_c$) than the transparent core and contains black light absorbing materials and also contains adhesive
64 transparent core of a waveguide with a refractive index of $n_r$
66 light ray traveling in air at a refractive index of $n_{air}$
68 refractived light ray as it enters the transparent core of the waveguide and hits the clad layer at critical angle b and is reflected back into the core and exits the core into air
70 refractive light ray as it reflects off the top cladding
72 waveguide suspended in air and air has a refractive index of $n_{air}$
74 imaginary perpendicular line projected through the transparent core and of the clad layers.
76 refractive boundary formed by the interface of the clad and core layers
80 black adhesive layer
82 clear cladding layer that has a lower refractive index than the transparent core
84 transparent core
86 clear bottom cladding layer that has a lower refractive index than the transparent core
88 black adhesive layer
90 light ray that is broken into segments that changes direction as it enters the light directing film and then reflects off the cladding layer
α angle formed by light ray 66 and the imaginary normal of the transparent core 60
β angle formed by refracted light ray 68 and imaginary perpendicular line 74 projected through the transparent core and of the clad layers.

What is claimed:

1. A waveguide comprising a transparent polymeric central core clad externally with one or more polymeric layers, at least one of the core or clad layers containing layered particles disposed in a polymeric binder, wherein a majority of the particles have a lateral dimension less than 1 micrometer.

2. The waveguide of claim 1 containing the particles in the clad layer.

3. The waveguide of claim 2 wherein the core is planar in shape.

4. The waveguide of claim 3 wherein said transparent central core and said clad layer have a thickness ratio of from 20:1 to 5:1.

5. The waveguide of claim 2 wherein the core is cylindrically shaped.

6. The waveguide of claim 2 wherein the polymeric binder further comprises an opaque material.

7. The waveguide of claim 6 wherein said opaque material is black.

8. The waveguide of claim 6 wherein said opaque material has a percent transmission from 1 to 30%.

9. The waveguide of claim 8 wherein said opaque material has a percent transmission of from 10 to 25%.

10. The waveguide of claim 1 wherein said polymeric binder comprises at least one material selected from the group consisting of water-soluble polymers, hydrophilic colloids, and water insoluble polymers.

11. The waveguide of claim 10 wherein the binder comprises a water-soluble polymer.

12. The waveguide claim 11 wherein the water-soluble polymer comprises at least one material selected from the group consisting of polyvinyl alcohol, polyethylene oxide, polystyrene sulfonate, polyvinyl pyrrolidone, polyacrylamide, polymethacrylamide, poly(N,N-dimethacrylamide), poly(N-isopropylacrylamide), polysaccharides and copolymers thereof.

13. The waveguide of claim 10 wherein the binder comprises a hydrophilic colloid.

14. The waveguide of claim 13 wherein said hydrophilic colloid comprises gelatin.

15. The waveguide of claim 10 wherein the binder comprises a water insoluble polymer.

16. The waveguide of claim 15 wherein said water-insoluble polymer comprises a latex.

17. The waveguide of claim 16 wherein said latex comprises a material selected from the group consisting of a polyester, a polyester ionomer, a polyolefin, a polyurethane, and copolymers thereof.

18. The waveguide of claim 15 wherein said water-insoluble polymer comprises a polymer derived from the monomer group consisting of styrene, acrylic and methacrylic acids and esters, maleic acid, itaconic acid, vinyl acetate, vinyl halide, vinylidene halide, and acrylonitrile.

19. The waveguide of claim 1 wherein said polymeric binder comprises a thermoplastic polymer.

20. The waveguide of claim 19 wherein said thermoplastic polymer comprises a material selected from the group consisting of polyester, polyolefin, polyurethane, polyamide, polycarbonate, polystyrene and copolymers thereof.

21. The waveguide of claim 1 wherein said polymeric binder comprises a thermosetting polymer.

22. The waveguide of claim 1 wherein said polymeric binder comprises a cellulose derivative.

23. The waveguide of claim 22 wherein said cellulose derivative comprises a material selected from the group consisting of carboxymethyl cellulose, hydroxyethyl cellulose, cellulose acetate, and cellulose acetate butyrate.

24. The waveguide of claim 1 wherein said polymeric binder comprises a polyester.

25. The waveguide of claim 1 wherein said polymeric binder comprises an adhesive to bind adjacent layers together.

26. The waveguide of claim 1 wherein said polymeric binder comprises a radiation curable material.

27. The waveguide of claim 26 wherein said radiation curable material is selected from the group of those containing an acrylate, epoxy and isobutylene moiety.

28. The waveguide of claim 1 wherein said layered particles comprise a hydrotalcite.

29. The waveguide of claim 1 wherein said layered particles comprise a phyllosilicate.

30. The waveguide of claim 29 wherein said phyllosilicate comprises a smectite.

31. The waveguide of claim 30 wherein said smectite comprises montmorillonite.

32. The waveguide of claim 31 wherein said montmorillonite comprises aluminum silicate.

33. The waveguide of claim 30 wherein said smectite comprises hectorite.

34. The waveguide component of claim 33 wherein said hectorite comprises magnesium silicate.

35. The waveguide of claim 33 wherein said hectorite is fluorinated.

36. The waveguide of claim 30 wherein said smectite is synthetic.

37. The waveguide of claim 30 wherein said smectite is organically modified.

38. The waveguide of claim 30 wherein said smectite is fluorinated.

39. The waveguide of claim 1 wherein said transparent central core comprises at least one material selected from the group consisting of polyester, cellulose acetate, polycarbonate, polymethylmethacrylate, poly(cyclic olefins) and copolymers thereof.

40. The waveguide of claim 1 wherein said transparent central core has a percent transmission of from 80 to 100%.

41. The waveguide of claim 1 wherein said transparent central core and said clad layer have a refractive index difference of from 0.001 to 0.35.

42. The waveguide of claim 41 wherein said transparent central core and said clad layer have a refractive index difference of from 0.01 to 0.30.

43. The waveguide of claim 1 wherein said transparent central core and said clad layer independently have a refractive index of from 1.0 to 2.4.

44. The waveguide of claim 1 wherein said layered particles have a thickness of between 0.5 and 10 nm.

45. The waveguide of claim 1 wherein said layered particles have a weight averaged aspect ratio of the largest to smallest particle dimension of between 10 and 1 to 1000 to 1.

46. The waveguide of claim 1 wherein said at least one of the core or clad layer contains from 1 to 90 wt % layered particles.

47. The waveguide of claim 1 wherein said clad layer contains from 1 to 90 wt. % layered particles.

48. The waveguide of claim 1 wherein said waveguide is a rear projection display screen.

49. The waveguide of claim 1 wherein the lateral dimension of the particles averages between 0.01 and 0.4 $\mu$m.

50. The waveguide of claim 1 wherein the lateral dimension of the particles averages between 0.01 and 0.05 $\mu$m.

51. The method of forming a waveguide comprising providing a transparent polymeric central core clad externally with one or more polymeric layers and including in at least one of the core or clad layer layered particles disposed in a polymeric binder, wherein a majority of the particles have a lateral dimension less than 1 micrometer.

* * * * *